(No Model.)
R. T. VAN VALKENBURG.
WIRE FENCE.
No. 591,064. Patented Oct. 5, 1897.
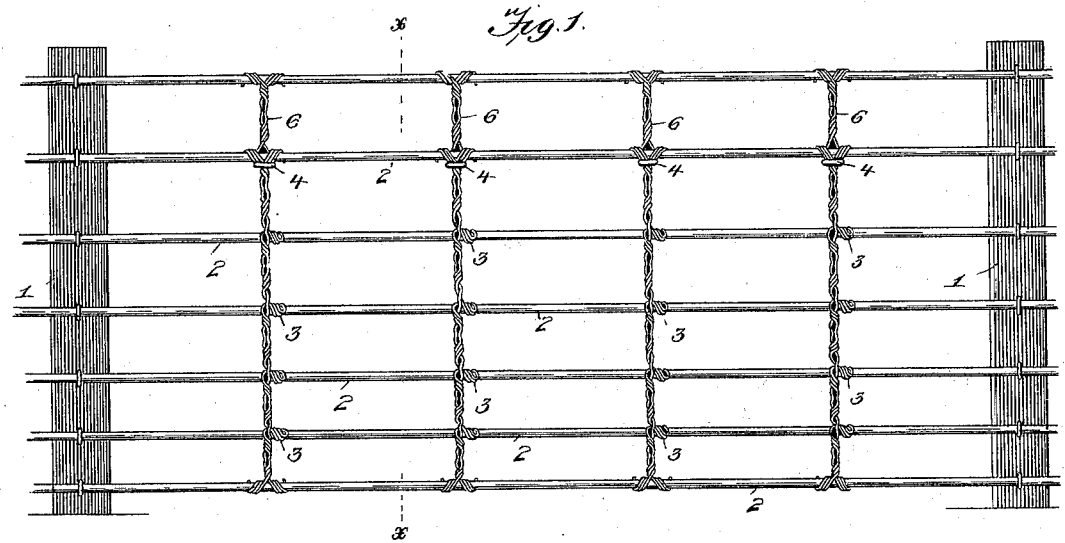
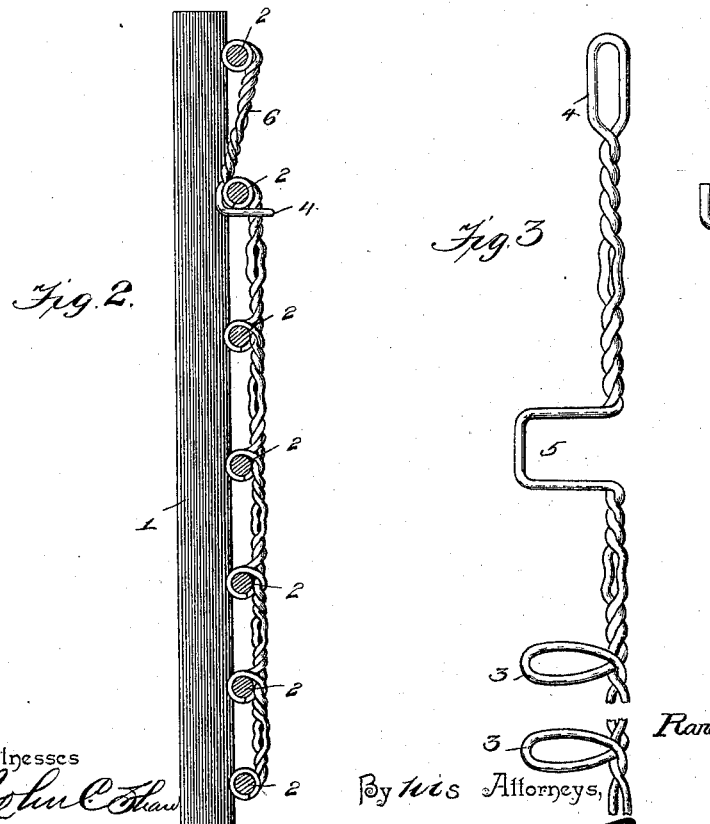
Witnesses
John C. Shaw
V. B. Hillyard.
Inventor
Randall T. Van Valkenburg
By his Attorneys,
C. A. Snow & Co.

UNITED STATES PATENT OFFICE.

RANDALL T. VAN VALKENBURG, OF BUCYRUS, OHIO, ASSIGNOR OF ONE-HALF TO JOHN N. NEAL, OF COLDWATER, MICHIGAN.

WIRE FENCE.

SPECIFICATION forming part of Letters Patent No. 591,064, dated October 5, 1897.

Application filed January 28, 1897. Serial No. 621,131. (No model.)

*To all whom it may concern:*

Be it known that I, RANDALL T. VAN VALKENBURG, a citizen of the United States, residing at Bucyrus, in the county of Crawford and State of Ohio, have invented a new and useful Wire Fence, of which the following is a specification.

This invention relates to wire fences, and more especially to the means for tying the line or fence wires together so as to secure and maintain them in a fixed relative position; and to this end the improvement consists of a stay having formed therewith an auxiliary or slip stay, the latter being detached from the main stay during the construction of the same.

The improvement also consists of a stay comprising a plurality of wires which are twisted together, one of the wires being looped at intervals in its length to provide means for securing the stay to the fence-wires, said loops being twisted about the fence-wires in the application of the stay thereto. In the formation of the stay the wires on each side of the loops are reversely twisted, thereby facilitating the process of manufacture. However, this is not essential, although preferred, as the said wires may be twisted in any convenient manner.

The improvement further consists of a wire fence having stays which are firmly attached to the fence-wires immediately below the topmost wire and in auxiliary or slip stays firmly attached to the topmost fence-wire and having their lower ends loosely connected with the upper portion of the respective stays, whereby the said topmost wire is adapted to yield to downward pressure without causing any sag in the fence-panel or buckling of the upper portion of the said stays.

The improvement also further consists of the novel features which hereinafter will be more particularly set forth and claimed and which are illustrated in the accompanying drawings, in which—

Figure 1 is a side elevation of a portion of wire fencing constructed in accordance with and embodying the essence of this invention. Fig. 2 is a vertical transverse section on the line X X of Fig. 1, looking to the right and on a larger scale. Fig. 3 is a side elevation of a stay constructed in accordance with this invention, parts being broken away. Fig. 4 is a side elevation of the auxiliary or slip stay detached from the main stay and having its ends separated.

Like numerals of reference designate corresponding parts in all the figures of the drawings.

The wire fencing may be of any desired pattern, and, as shown, comprises fence-posts 1 and a series of line or fence wires 2, the latter being attached to the fence-posts in any approved way.

The improved stay comprises a plurality of wires which are twisted together, and one of these wires is formed at intervals in its length corresponding to the position and number of the fence-wires 2 with loops 3, which are intended to be twisted about the said fence-wires in the application of the stay thereto. In the preferable formation of the stay a wire of suitable length is provided and doubled upon itself, the folded or parallel portion being twisted together, substantially as shown. The folded end of the wire is left open to provide an eye 4 for the purpose hereinafter to be described, and the wires at a short distance from the eye 4 are bent to provide a square loop 5, the members of which are not twisted together, as are the remaining portions of the wires on each side thereof. The wires are reversely twisted together on opposite sides of the loops, because in practice such construction facilitates the manufacture of the stays and obviates buckling and kinking thereof. While this manner of twisting is the most desirable, it will be understood that the wires may be twisted together in any manner found most convenient and which will facilitate the manufacture of the article.

The stays are constructed substantially as shown in Fig. 3 and are shipped in bundles, and in the construction of the wire fencing the individual stays are applied to the fence-wires and are secured thereto by having the loops 3 twisted about the intermediate fence-wires and by having the loose end portion twisted about the lowermost and the upper-most fence-wire but one, substantially in the manner shown. The end portion of each stay from the eye 4 to about the middle of the square loop 5 forms the auxiliary or slip stay 6, and the latter is severed from the main stay just prior to the application thereof to the fence or after the said stay has been secured to the fence-wires, except the one immediately below the topmost fence-wire. In the latter instance the slip-stay is detached prior to the twisting of the upper end of the stay about the fence-wire immediately below the topmost wire.

The auxiliary or slip stay is applied to the fence in the following manner: The eye portion 4 is bent at about right angles to the length of the stay, and the said bent portion is slipped upon the upper end of the main stay prior to securing it to its fence-wire, and the upper portion of the said slip-stay has the parts forming the square loop spread, as shown in Fig. 4, and fastened to the topmost fence-wire by being twisted therearound. By this construction it will be seen that the said auxiliary stay has a loose connection with the upper portion of the main stay and is adapted to move thereon in the event of the topmost fence-wire being depressed, thereby obviating a sagging of the fence-panel or buckling of the upper portion of the stay, while at the same time the said topmost fence-wire is prevented from having independent upward movement. It will be understood that there will be an auxiliary or slip stay for each main stay, and by having the two stays integrally formed economy of construction results and the construction of the fencing is facilitated in that no time is consumed in assorting and assembling the different parts. The twisting of the loops 3 and the ends of the stays about the fence-wires will be attained in any desired manner and will readily suggest itself to one skilled in the art of erecting wire fences.

A fence-stay of the construction herein set forth is strong and durable and can be readily applied to any style of fencing, whether plain or barbed wire, and is light and durable and can be manufactured at a minimum cost consistent with the resultant advantages.

Having thus described my invention, what is claimed as new is—

1. A wire fence comprising a series of line-wires secured to suitable supports, main stays composed of wires twisted together and having one of the wires of each stay extended at intervals in its length to provide loops which are secured to the intermediate fence-wires by being twisted therearound, the end portions of the said stays being firmly attached to the lowermost and to the topmost fence-wires but one, and auxiliary or slip stays formed of wires doubled upon themselves and having their upper ends firmly attached to the topmost wire, and having the folded parts twisted together, leaving an eye at their lower ends through which the upper ends of the respective main stays play loosely, substantially as described for the purpose set forth.

2. The herein-described stay for wire fencing, comprising a plurality of wires twisted together and having an eye at one end and a series of offstanding loops at intervals in its length, the loop adjacent to the eye end of the stay being opened and adapted to be severed between its ends to provide an auxiliary or slip stay, substantially as set forth, for the purpose described.

3. As a new article of manufacture, a fence-stay formed from a wire which is doubled upon itself to provide an eye at one end, and which has its folded portions twisted together, except for a short distance near the said eye, which portion is bent to provide an open loop 5, and having one of the wires formed into closed loops 3, the said wires being reversely twisted on opposite sides of the said loops, substantially as set forth for the purpose described.

In testimony that I claim the foregoing as my own I have hereto affixed my signature in the presence of two witnesses.

RANDALL T. VAN VALKENBURG.

Witnesses:
 GEO. SCHWARTZMAN,
 JOHN N. NEAL.